United States Patent
Kim et al.

(10) Patent No.: US 10,049,277 B2
(45) Date of Patent: *Aug. 14, 2018

(54) METHOD AND APPARATUS FOR TRACKING OBJECT, AND METHOD AND APPARATUS FOR CALCULATING OBJECT POSE INFORMATION

(71) Applicant: Samsung Electronics Co., Ltd., Suwon-si (KR)

(72) Inventors: Jung-bae Kim, Hwaseong-si (KR); Haitao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

This patent is subject to a terminal disclaimer.

(21) Appl. No.: 14/568,337

(22) Filed: Dec. 12, 2014

(65) Prior Publication Data

US 2015/0131859 A1 May 14, 2015

Related U.S. Application Data

(63) Continuation of application No. 11/987,281, filed on Nov. 28, 2007, now Pat. No. 8,934,665.

(30) Foreign Application Priority Data

Feb. 7, 2007 (KR) .................. 10-2007-0012798

(51) Int. Cl.
*G06K 9/00* (2006.01)
*G06K 9/62* (2006.01)
(Continued)

(52) U.S. Cl.
CPC ...... *G06K 9/00711* (2013.01); *G06K 9/00228* (2013.01); *G06K 9/00261* (2013.01);
(Continued)

(58) Field of Classification Search
CPC .......... G06K 9/00221; G06K 9/00228; G06K 9/00234; G06K 9/00248; G06K 9/00261;
(Continued)

(56) References Cited

U.S. PATENT DOCUMENTS 5,625,715 A * 4/1997 Trew .................. G06K 9/00228
382/103
6,332,038 B1 12/2001 Funayama et al.
(Continued)

FOREIGN PATENT DOCUMENTS

KR 10-2006-0123438 A 12/2006

OTHER PUBLICATIONS

Zoltan Vamossy, Akos Toth and Peter Hirschberg, "PAL Based Localization Using Pyramidal Lucas-Kanade Feature Tracker", 2nd Serbian-Hungarian Joint Symposium on Intelligent Systems, 2004, pp. 223-231.*

(Continued)

*Primary Examiner* — Eric Rush
(74) *Attorney, Agent, or Firm* — NSIP Law

(57) ABSTRACT

A method and apparatus for tracking an object, and a method and apparatus for calculating object pose information are provided. The method of tracking the object obtains object feature point candidates by using a difference between pixel values of neighboring frames. A template matching process is performed in a predetermined region having the object feature point candidates as the center. Accordingly, it is possible to reduce a processing time needed for the template matching process. The method of tracking the object is robust in terms of sudden changes in lighting and partial occlusion. In addition, it is possible to track the object in real time. In addition, since the pose of the object, the pattern of (Continued)

the object, and the occlusion of the object are determined, detailed information on action patterns of the object can be obtained in real time.

14 Claims, 6 Drawing Sheets

(51) Int. Cl.
| | |
|---|---|
| G06T 3/00 | (2006.01) |
| G06K 9/32 | (2006.01) |
| G06T 7/20 | (2017.01) |
| G06T 7/38 | (2017.01) |
| G06T 7/246 | (2017.01) |
| G06K 9/46 | (2006.01) |
| G06K 9/52 | (2006.01) |
| G06T 7/70 | (2017.01) |

(52) U.S. Cl.
CPC ....... *G06K 9/00268* (2013.01); *G06K 9/3241* (2013.01); *G06K 9/46* (2013.01); *G06K 9/52* (2013.01); *G06K 9/6201* (2013.01); *G06K 9/6202* (2013.01); *G06K 9/6203* (2013.01); *G06K 9/6206* (2013.01); *G06T 3/0006* (2013.01); *G06T 3/0075* (2013.01); *G06T 7/20* (2013.01); *G06T 7/246* (2017.01); *G06T 7/248* (2017.01); *G06T 7/38* (2017.01); *G06T 7/70* (2017.01); *G06K 2009/3291* (2013.01)

(58) Field of Classification Search
CPC .......... G06K 9/00268; G06K 9/00281; G06K 9/00597; G06K 9/00604; G06K 9/3233; G06K 9/3241; G06K 9/4604; G06K 9/52; G06K 9/6201; G06K 9/6202; G06K 9/6203; G06K 9/6206; G06K 9/6207; G06K 9/6209; G06K 9/621; G06K 9/6211; G06K 2009/3291; G06K 9/46; G06T 3/0006; G06T 3/0068; G06T 3/0075; G06T 3/0081; G06T 3/60; G06T 7/149; G06T 7/20; G06T 7/223; G06T 7/246; G06T 7/248; G06T 7/254; G06T 7/30; G06T 7/32; G06T 7/38; G06T 7/70; G06T 7/73; G06T 7/74; G06T 7/75
USPC ........ 382/103, 117, 118, 190, 209, 215–219, 382/221, 282, 291, 293–296; 348/169
See application file for complete search history.

(56) References Cited

U.S. PATENT DOCUMENTS

| | | | |
|---|---|---|---|
| 6,628,819 B1* | 9/2003 | Huang | G06T 7/579 382/154 |
| 6,674,877 B1* | 1/2004 | Jojic | G06K 9/00369 382/103 |
| 7,142,600 B1* | 11/2006 | Schonfeld | G06T 7/215 375/240.16 |
| 7,542,624 B1* | 6/2009 | Koch | G06K 9/00214 382/106 |
| 7,620,216 B2 | 11/2009 | Hammoud | |
| 7,840,035 B2 | 11/2010 | Takeda et al. | |
| 7,957,466 B2* | 6/2011 | Paniconi | H04N 19/51 345/423 |
| 8,073,196 B2* | 12/2011 | Yuan | G06K 9/32 348/169 |
| 2003/0031344 A1 | 2/2003 | Maurer et al. | |
| 2003/0053685 A1 | 3/2003 | Lestideau | |
| 2004/0240708 A1* | 12/2004 | Hu | G06K 9/00268 382/103 |
| 2005/0073585 A1* | 4/2005 | Ettinger | H04N 7/18 348/155 |
| 2005/0074148 A1 | 4/2005 | Rodyushkin et al. | |
| 2005/0094849 A1 | 5/2005 | Sung et al. | |
| 2005/0196017 A1* | 9/2005 | Altherr | G06T 7/246 382/103 |
| 2005/0271295 A1* | 12/2005 | Tabata | G06T 7/136 382/274 |
| 2006/0153430 A1* | 7/2006 | Canzler | G06K 9/00281 382/118 |
| 2006/0188131 A1* | 8/2006 | Zhang | G06T 7/74 382/103 |
| 2006/0193535 A1* | 8/2006 | Mishima | G06K 9/6206 382/294 |
| 2006/0215017 A1* | 9/2006 | Cohen | H04N 7/148 348/14.16 |
| 2007/0122121 A1* | 5/2007 | Tanabe | G11B 27/105 386/224 |
| 2007/0133840 A1* | 6/2007 | Cilia | G06K 9/00369 382/103 |
| 2007/0147661 A1* | 6/2007 | Fukaya | G06K 9/00248 382/104 |
| 2007/0258645 A1* | 11/2007 | Gokturk | G06K 9/00288 382/190 |
| 2008/0130948 A1 | 6/2008 | Ozer | |

OTHER PUBLICATIONS

Bettinger, et al. "Modelling Facial Behaviours." IEEE International Conference on Automatic Face and Gesture Recognition. (2002): 797-806. Print.
Bourel, et al. "Robust Facial Feature Tracking." Proc. 11th British Machine Vision Conference. (2000): 232-241. Print.
Bruce D. Lucas et al., "An Iterative Image Registration Technique with an Application to Stereo Vision", pp. 674-679 (1981).
Cohn, et al. "Feature-Point Tracking by Optical Flow Discriminates Subtle Differences in Facial Expression." Proceedings International Conference on Automatic Face and Gesture Recognition. (1998): 396-401. Print.
Cootes, et al. "Active Appearance Models." IEEE Transactions on Pattern Analysis and Machine Intelligence. 23.6 (2001): 681-685. Print.
Daniel F. DeMenthon et al., "Model-Based Object Pose in 25 Lines of Code", Computer Vision Laboratory Center for Automation Research, pp. 1-30 (1995).
DeCarlo, et al. "The Integration of Optical Flow and Deformable Models with Applications to Human Face Shape and Motion Estimation." Proceedings CVPR '96. (1996): 231-238. Print.
Fabrice Bourel et al., "Robust Facial Feature Tracking", BMVC2000, School of Computing, Staffordshire University, 10 pages (2000).
Herley, Cormac. "Automatic Occlusion Removal from Minimum Number of Images." Image Processing, IEEE International Conference—ICIP. (2005): 1046-1049. Print.
Iain Matthews et al., "Active Appearance Models Revisited", The Robotics Institute Carnegie Mellon University, 53 pages (2004).
Jean-Yves Bouguet, "Pyramidal Implementation of the Lucas Kanade Feature Tracker Description of the algorithm", Intel Corporation Microprocessor Research Labs, pp. 1-9 (2000).
Loewenich, et al. "A Head-Tracker based on the Lucas-Kanade Optical Flow Algorithm." Proceedings Active Media Technology. (2006): 25-30. Print.
Office Action dated Nov. 28, 2007 in corresponding Korean Patent Application No. 10-2007-0012798 (in Korean, 4 pages).
Paul Viola et al., "Robust Real-Time Face Detection", International Journal of Computer Vision. vol. 52, No. 2, 2004, pp. 137-154.
Sarris et al. "FAP Extraction Using Three-Dimensional Motion Estimation." IEEE Transactions on Circuits and Systems for Video Technology. 12.10 (2002): 865-876. Print.
T.F. Cootes et al., "Active Appearance Models", Proc. European Conference on Computer Vision, vol. 2, 1998, 16 pages.
Tomasi, et al. "Detection and Tracking of Point Features." International Journal of Computer Vision. (1991): 1-22. Print.

(56) References Cited

OTHER PUBLICATIONS

Vamossy, et al. "PAL Based Localization Using Pyramidal Lucas-Kanade Feature Tracker." 2nd Serbian-Hungarian Joint Symposium on Intelligent Systems. (2004): 223-231. Print.
Zhengyou Zhang, "Flexible Camera Calibration by Viewing a Plane From Unknown Orientations", Microsoft Research, IEEE, 1999, 8 pages.

* cited by examiner

METHOD AND APPARATUS FOR TRACKING OBJECT, AND METHOD AND APPARATUS FOR CALCULATING OBJECT POSE INFORMATION

CROSS-REFERENCE TO RELATED PATENT APPLICATION

This application is a continuation of U.S. patent application Ser. No. 11/987,281 filed on Nov. 28, 2007, which claims the benefit of Korean Patent Application No. 10-2007-0012798, filed on Feb. 7, 2007, in the Korean Intellectual Property Office, the disclosure of which is incorporated herein in its entirety by reference.

BACKGROUND OF THE INVENTION

1. Field of the Invention

The present invention relates to a method and apparatus for tracking an object, and a method and apparatus for calculating object pose information, and more particularly, to a method and apparatus for automatically tracking an object in real time and estimating an object pose from an input video image, and a method and apparatus for calculating object pose information.

2. Description of the Related Art

A technique of detecting a predetermined object from a video image and tracking the predetermined object has been developed in the fields of security and face recognition. In the case of a security system, in order to automatically detect a person who enters a detection zone, it is necessary to detect an object which enters the detection zone and track the motion of the object. A difference method is used as a typical method of tracking an object.

In the difference method, the object is tracked by using the difference between an input image obtained by an image acquisition device and a prepared reference image.

In US patent publication No. 2003/0031344, a method is disclosed in which a user directly assigns locations of at least one tracking node, reinitializes the tracking nodes, and automatically tracks off-line face features based on the renormalized tracking nodes. However, in the aforementioned patent, when the object is changed, the user has to directly renormalize the tracking nodes so as to track a new object.

In US patent publication No. 2004/0240708, a method of using a repeated sum of squares difference (SSD) and a method in which a pose is estimated by recognizing a shape change of a 2-dimensional (2D) triangle are disclosed. However, in this case, since a face image is simplified as a 2D triangle, the accuracy of estimating the poses decreases.

In addition, existing methods of tracking an object using an optical flow are weak in terms of partial occlusion. It takes much processing time to track an object by using the existing methods. Accordingly, it is difficult to apply the existing methods to a system for tracking an object in real time.

SUMMARY OF THE INVENTION

The present invention provides a method and apparatus for tracking an object in real time with improved accuracy capable of reducing a processing time needed for a template matching process, which is robust in terms of sudden changes in lighting and partial occlusion. The present invention also provides a method and apparatus for calculating object pose information capable of determining information on action patterns of an object such as poses of the object, patterns of the object, and occlusion of the object in real time.

The present invention also provides a computer-recordable medium having embodied thereon a computer program for executing the video image tracking method.

According to an aspect of the present invention, there is provided a method of tracking an object comprising: detecting predetermined object feature points in a (N−1)-th (N is a positive integer greater than 1) frame; estimating object feature point candidates of an N-th frame by using a difference between a pixel value of the (N−1)-th frame and a pixel value of the N-th frame; and estimating object feature points of the N-th frame by searching a predetermined region surrounding the estimated object feature point candidates of the N-th frame for a template similar to a predetermined template including the detected object feature points.

According to another aspect of the present invention, there is provided a method of calculating object pose information comprising: detecting predetermined object feature points in a (N−1)-th (N is a positive integer greater than 1) frame; estimating object feature point candidates of an N-th frame by using a difference between a pixel value of the (N−1)-th frame and a pixel value of the N-th frame; estimating object feature points of the N-th frame by searching a predetermined region surrounding the estimated object feature point candidates of the N-th frame for a template similar to a predetermined template including the detected object feature points; and calculating object pose information by using coordinate values detected in the (N−1)-th frame and coordinate values of the object feature points detected in the N-th frame.

According to another aspect of the present invention, there is provided an apparatus for tracking a video image object, the apparatus comprising: an initialization unit which initializes a tracking process by detecting object feature points from a video image; a first tracking unit which estimates object feature point candidates of an N-th frame by using a difference between a pixel value of an (N−1)-th (N is a positive integer greater than 1) frame and a pixel value of the N-th frame; and a second tracking unit which searches a predetermined region surrounding the determined object feature point candidates for a template similar to a template including the object feature points of the (N−1)-th frame and estimates the object feature points.

According to another aspect of the present invention, there is provided an apparatus for calculating object pose information, the apparatus comprising: an initialization unit which initializes a tracking process by detecting object feature points from a video image; a first tracking unit which estimates object feature point candidates of an N-th frame by using a difference between a pixel value of an (N−1)-th (N is a positive integer greater than 1) frame and a pixel value of the N-th frame; a second tracking unit which searches a predetermined region surrounding the determined object feature point candidates for a template similar to a template including the object feature points of the (N−1)-th frame and estimates the object feature points; and an object pose information calculation unit which calculates object pose information by using coordinate values of the object feature points detected by initializing the tracking process and coordinate values of the object feature points of the N-th frame.

According to another aspect of the present invention, there is provided a computer readable recording medium in which the method of tracking a video image object can be implemented on a computer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, preferred embodiments of a method and apparatus for tracking an object according to an embodiment of the present invention will be described in detail with reference to the attached drawings.

Figure 1:
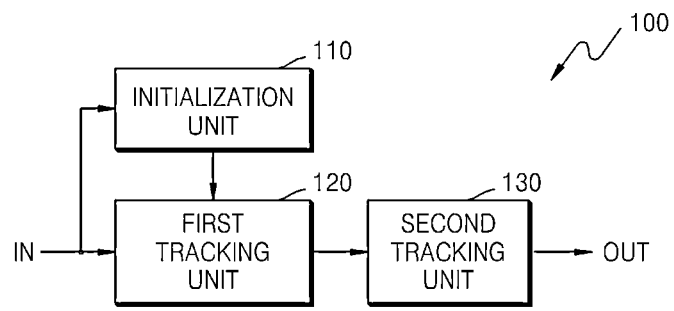
FIG. 1 is a block diagram illustrating an apparatus for tracking an object according to an embodiment of the present invention.

FIG. 1 is a block diagram illustrating an apparatus for tracking an object according to an embodiment of the present invention. In the current embodiment, the apparatus for tracking an object includes an initialization unit 110, a first tracking unit 120, and a second tracking unit 130.

The initialization unit 110 detects predetermined feature points in the (N−1)-th frame. Specifically, the initialization unit 110 detects a face image in an image of the first frame and selects face feature points which represent main features of the face in the detected face image. In this case, the object is a human face. For example, the detected feature points of the object may include two points corresponding to center locations of eyes, two points corresponding to center locations of eyebrows, one point corresponding to an end of a nose, two points corresponding to both ends of lips, and a point corresponding to a top center location of an upper lip.

Methods of detecting feature points of an object (hereinafter, object feature points) may be active appearance models (AAM) or active shape models (ASM). In the ASM, locations of eyes are determined and locations of other parts are determined based on the detected locations of the eyes by using information on the shapes of other parts, for example, a nose, a mouth, and eyebrows depending on a generic model. In the AAM, feature points capable of effectively describing face features are detected by further considering texture information in addition to the shape information. In the current embodiment, the initialization unit 110 detects eight feature points including two eyebrows, two eyes, one nose, two ends of the lips, and a top center location of an upper lip, as shown in image A illustrated in FIG. 3, by using the AAM.

The first tracking unit 120 determines object feature candidates of the N-th frame by using a difference between a pixel value of the (N−1)-th frame and a pixel value of the N-th frame. When the face feature points are detected in the first frame by the initialization unit 110, the first tracking unit 120 calculates an optical flow in which a difference between a pixel value of the first frame and a pixel value of the second frame is minimized. For example, a gray level of a template image of predetermined size having the face feature point detected in the first frame as the center and a gray level of a template image of the second frame corresponding to the template image of the first frame are obtained, and an optical flow can be calculated by using a difference between the gray levels of the neighboring frames of each pixel. In the current embodiment, the optical flow is calculated by using a Lucas-Kanade-Tomasi (LKT) algorithm, and the optical flow v in which a value of ε(v) is minimized according to the following Equations 1 to 5 can be calculated.

$$\varepsilon(v) = \quad \text{[Equation 1]}$$

$$\varepsilon(v_x, v_y) = \sum_{x=u_x-\omega_x}^{u_x+\omega_x} \sum_{y=u_y-\omega_y}^{u_y+\omega_y} (I(x, y) - J(x+v_x, y+v_y))^2$$

$$I_x(x, y) = \frac{I(x+1, y) - I(x-1, y)}{2}, \quad \text{[Equation 2]}$$

$$I_y(x, y) = \frac{I(x, y+1) - I(x, y-1)}{2}$$

$$G(u_x, u_y) = \sum_{x=u_x-\omega_x}^{u_x+\omega_x} \sum_{y=u_y-\omega_y}^{y_y+\omega_y} \begin{bmatrix} I_x^2 & I_x I_y \\ I_x I_y & I_y^2 \end{bmatrix}, \quad \text{[Equation 3]}$$

$$\delta I(x, y) = I(x, y) - J(x, y)$$

$$\overline{b} = \sum_{x=u_x-\omega_x}^{u_x+\omega_x} \sum_{y=u_y-\omega_y}^{u_y+\omega_y} \begin{bmatrix} \delta I I_x \\ \delta I I_y \end{bmatrix} \quad \text{[Equation 4]}$$

$$v = G^{-1} \overline{b} \quad \text{[Equation 5]}$$

Here, I is a previous (N−1)-th frame, J is a current N-th frame, $u=(u_x, u_y)$ is a feature point in the previous frame, $v=(v_x, v_y)$ is an optical flow, $(w_x, w_y)$ is a template size of an image of which optical flow is calculated, and $I_x$ and $I_y$ are a differential image value of I.

The second tracking unit 130 searches the N-th frame for a template similar to the template including object feature points of the (N−1)-th frame and estimates the object feature points in the N-th frame based on the result of the search. Specifically, the second tracking unit 130 searches a predetermined search region surrounding object feature point candidates determined by the first tracking unit 120 as a template similar to the template of the (N−1)-th frame. The size of the search region has to be greater than that of the template. It is possible to reduce a processing time needed for searching for the most similar template by introducing the search region unlike in the existing techniques.

In the current embodiment, a template matching technique is used as the method of searching for the most similar template. It is possible to determine a template, in which a value ρ, according to Equation 6, is at a minimal, as the most similar template.

$$\rho = \frac{\sum_{a=-\omega_x}^{+\omega_x}\sum_{b=-\omega_y}^{+\omega_y}((I(u_x+a,u_y+b)-\bar{I})(J(x+a,y+b)-\bar{J}))}{\sqrt{\sum_{a=-\omega_x}^{+\omega_x}\sum_{b=-\omega_y}^{+\omega_y}((I(u_x+a,u_y+b)-\bar{I}))^2 \sum_{a=-\omega_x}^{+\omega_x}\sum_{b=-\omega_y}^{+\omega_y}((J(x+a,y+b)-\bar{J}))^2}}$$

[Equation 6]

Here, I is the previous (N−1)-th frame, J is the current N-th frame, u=($u_x$, $u_y$) is a feature point in the previous frame, v=($v_x$, $v_y$) is an optical flow, ($w_x$, $w_y$) is a template size of an image of which optical flow is calculated, and ρ is a correlation coefficient. (x, y), at which the value ρ calculated using Equation 6 is at a maximum, is a coordinate of a feature point of the N-th frame corresponding to a feature point of the (N−1)-th frame. The second tracking unit 130 calculates the value ρ depending on any (x, y) order pair and searches for (x, y) at which the value ρ is at a maximum. The search region has a predetermined size ($S_x$, $S_y$) having a feature point candidate determined by the first tracking unit 120 as a center.

Figure 3:
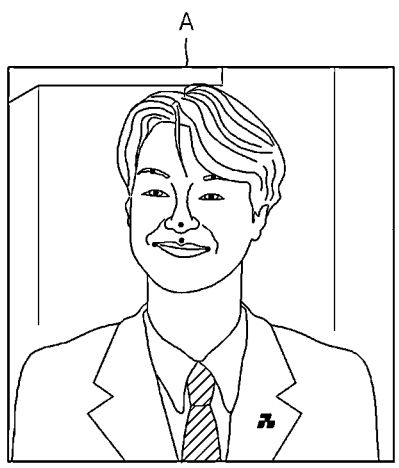
FIG. 3 is a reference view for illustrating a concept of tracking an object according to an embodiment of the present invention.
Figure 3:
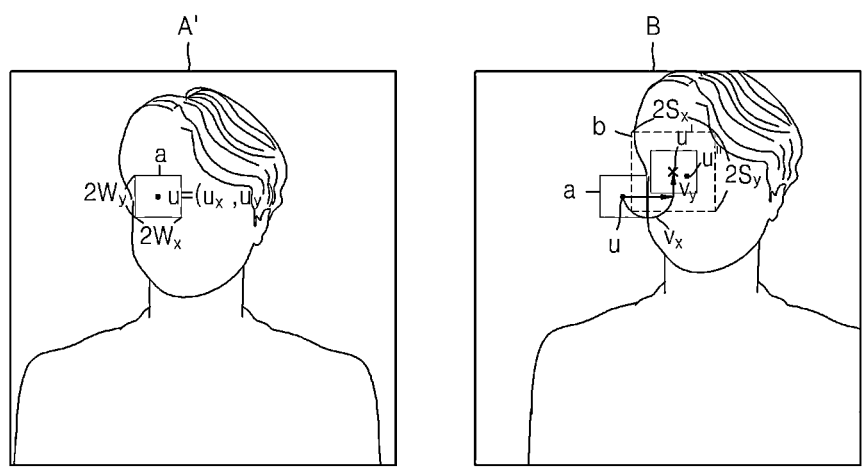

FIG. 3 is a reference view for illustrating a concept of tracking an object according to an embodiment of the present invention.

A video image A is the first frame image. Eight points located at eyebrows, eyes, a nose, and lips are feature points of a face image. A video image A' is used to illustrate a concept of tracking an object. The video image A' is obtained by representing only a profile of a person and a location of a right eye in the video image A. a is a template region, u=($u_x$, $u_y$) is a feature point of a right eye, and $2w_x$ and $2w_y$ are the length and width of the template region. A video image B is the second frame image. The video image B is a video image which represents a case where the person in the first frame moves to the right. u' is an object feature point candidate determined by the first tracking unit 120, u" is an object feature point determined by the second tracking unit 130, and $2S_x$ and $2S_y$ are the length and width of a search region.

The first tracking unit 120 calculates a candidate u' with respect to a moving point of u=($u_x$, $u_y$) by using the LKT method. The second tracking unit 130 determines a moving point u" of u=($u_x$, $u_y$) by performing a template matching process. Specifically, the second tracking unit 130 searches for a template which is closely correlated with a template a in the search region b having the point u' as the center and determines the center point of the found template to be an object feature point u" of the second frame.

Figure 2:
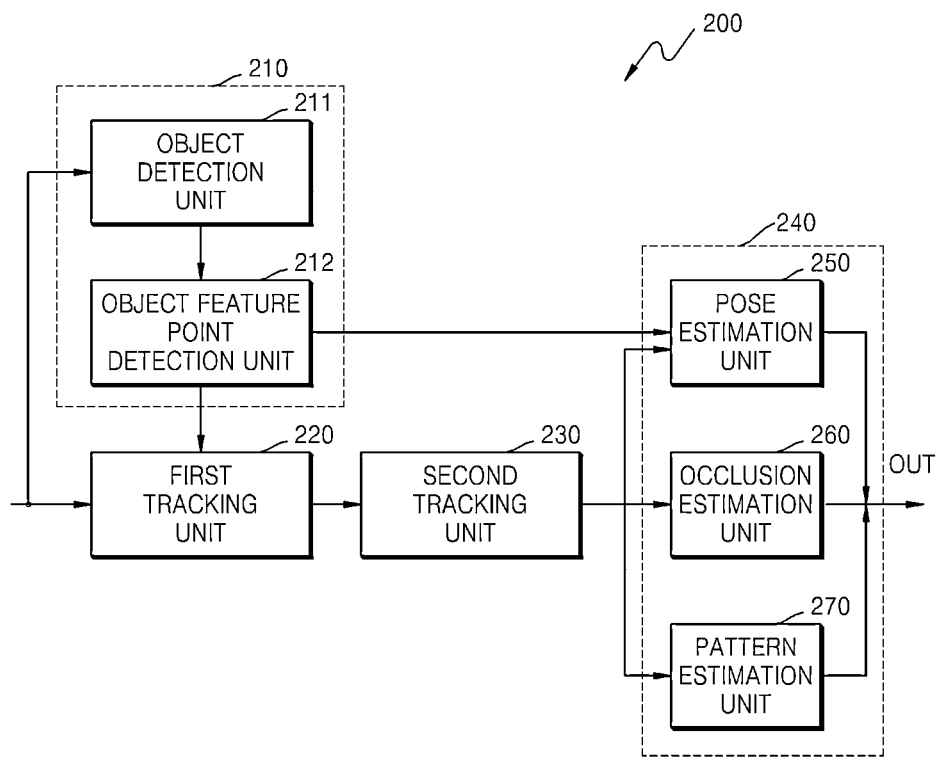
FIG. 2 is a block diagram illustrating an apparatus for calculating object pose information according to an embodiment of the present invention.

FIG. 2 is a block diagram illustrating an apparatus for calculating object pose information according to an embodiment of the present invention. The apparatus for calculating object pose information according to the current embodiment includes an initialization unit 210, a first tracking unit 220, a second tracking unit 230, and an object pose information generation unit 240. The apparatus for calculating the object pose information, as illustrated in FIG. 2, has substantially the same structure as the apparatus for tracking the object, as illustrated in FIG. 1, except that the apparatus for calculating the object pose information further includes an object pose information generation unit 240.

The initialization unit 210 is substantially the same as the initialization unit 110 shown in FIG. 1. FIG. 2 discloses a detailed block structure for the initialization unit 210. In the current embodiment, the initialization unit 210 includes an object detection unit 211 and an object feature point detection unit 212. The object detection unit 211 detects a face image from the video image of the first frame. The object feature point detection unit 212 selects feature points with respect to main parts of the face from the face image detected by the object detection unit 211 as the object feature points. Specifically, the object feature point detection unit 212 detects the aforementioned feature points as the object feature points by using the AAM or ASM.

The first tracking unit 220 tracks the object feature points detected by the object feature point detection unit 212. The first tracking unit 220 calculates an optical flow in which a difference between a pixel value of the (N−1)-th frame and a pixel value of the N-th frame is minimized based on the LKT algorithm. The second tracking unit 230 searches a predetermined search region surrounding the object feature point candidate determined by the first tracking unit 120 as a template similar to the template of the (N−1)-th frame.

The object pose information generation unit 240 includes a pose estimation unit 250, an occlusion estimation unit 260, and a pattern estimation unit 270.

The pose estimation unit 250 estimates the pose information on the object of the N-th frame. The pose estimation unit 250 estimates the object pose information of the N-th frame by using feature point information for each frame such as information on initialized feature points, information on a generic model, information on camera parameters, and information on heights of the object feature points. Here, an example of the object pose information is view information, that is, information on a 3-dimensional (3D) direction in which the face of the person looks. An example of the information on the feature points is coordinate information on the aforementioned eight feature points. The information on the generic model is determined by a previous learning process using a plurality of training face-images. An example of the information on the generic model is 3D view information depending on eight feature points. An example of the information on the camera parameters is a focal distance. An example of information on height values of the object feature points is information on the heights of eyes, a noise, lips, and eyebrows when a face is viewed as a side profile. The heights of the end of the nose, the lips and the eyebrows can be represented by a ratio 16 to 5 to 3 on the basis of the height of the eyes.

Figure 4:
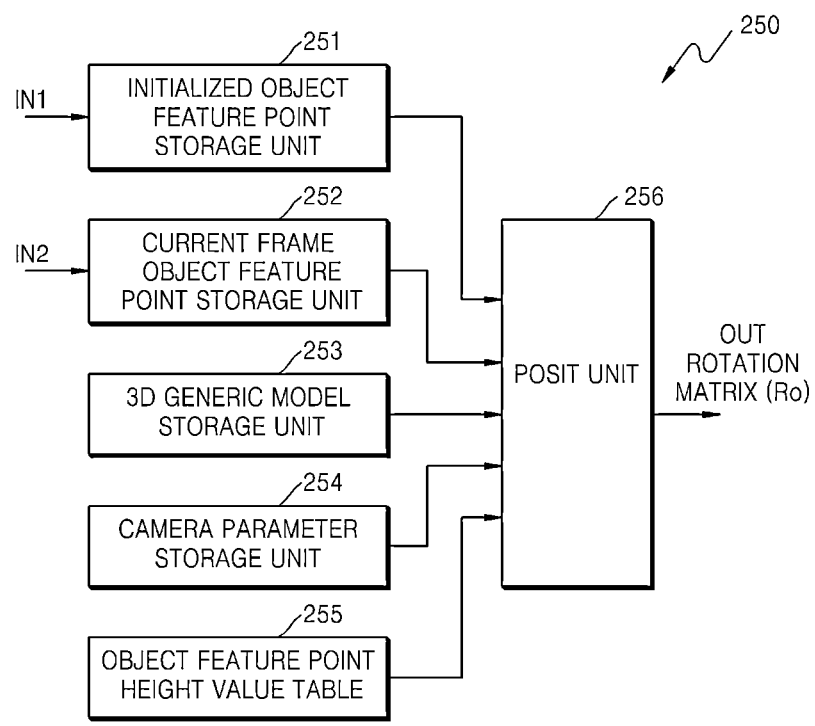
FIG. 4 is a block diagram illustrating a detailed structure of a pose estimation unit illustrated in FIG. 2.

FIG. 4 is a block diagram illustrating a detailed structure of the pose estimation unit 250 illustrated in FIG. 2.

The pose estimation unit 250 includes an initialized feature point storage unit 251, a current frame object feature point storage unit 252, a 3D generic model storage unit 253, a camera parameter storage unit 254, an object feature point height value table storage unit 255, and a pose from orthography and scaling with iterations (POSIT) unit 256. The aforementioned storage units 251 to 255 respectively store information on initialized object feature points, information on N-th frame feature points, 3D information on a generic model, information on camera parameters, and information on heights of the object feature points. The pose estimation unit 250 calculates information on a direction in which the object faces, for example, a rotation matrix having a roll, a pitch, and a yaw as components. The POSIT unit 256 calculates object pose information by using a POSIT that is an algorithm for calculating the object pose information. The POSIT is suitable to calculate the object pose information in real time as an algorithm for searching for an object pose from a single image.

Referring back to FIG. 2, an occlusion estimation unit 260 estimates whether the object feature points are occluded and generates occlusion information on whether the object feature points are occluded.

$$P_i = \frac{p_i - \frac{1}{8}\sum_{i=1}^{8} p_i}{\sum_{i=1}^{8} \sqrt{\left(p_i - \frac{1}{8}\sum_{i=1}^{8} p_i\right)\left(p_i - \frac{1}{8}\sum_{i=1}^{8} p_i\right)^T}}$$ [Equation 7]

Here, $p_i = (x_i, y_i)$ is a coordinate of a feature point, and Pi is a normalized coordinate of the feature point. When a feature point coordinate matrix $X=(x, y)^T$ of the (N−1)-th frame and a feature point coordinate matrix $X'=(x', y')^T$ of the N-th frame are normalized feature point coordinates, it is possible to estimate whether there are occluded feature points by using an affine transformation.

$$E = |T(X) - X'|$$ [Equation 8]

Here, T(X) is the affine transformation whose input is a coordinate matrix X of the (N−1)-th frame, and X' is a coordinate matrix of the N-th frame. The affine transformation T is a transformation matrix in which the value E is minimized.

$$S_x = \frac{1}{n}\sum_{i=1}^{n} x_i \qquad S_y = \frac{1}{n}\sum_{i=1}^{n} y_i$$ [Equation 9]

$$S_{x'} = \frac{1}{n}\sum_{i=1}^{n} x'_i \qquad S_{y'} = \frac{1}{n}\sum_{i=1}^{n} y'_i$$

$$S_{xx} = \frac{1}{n}\sum_{i=1}^{n} x_i^2 \qquad S_{yy} = \frac{1}{n}\sum_{i=1}^{n} y_i^2$$

$$S_{xy} = \frac{1}{n}\sum_{i=1}^{n} x_i y_i$$

$$S_{xx'} = \frac{1}{n}\sum_{i=1}^{n} x_i x'_i \qquad S_{yy'} = \frac{1}{n}\sum_{i=1}^{n} y_i y'_i$$

$$S_{xy'} = \frac{1}{n}\sum_{i=1}^{n} x_i y'_i \qquad S_{yx'} = \frac{1}{n}\sum_{i=1}^{n} y_i x'_i$$

Here, $(x_i, y_i)$ is a coordinate of the object feature points estimated in the previous frame ((N−1)-th frame), and $(x'_i, y'_i)$ is a coordinate of the object feature points estimated in the current frame (N-th frame).

$$T\binom{x}{y} = \binom{a\ b}{c\ d}\binom{x}{y} + \binom{t_x}{t_y}, t_x = S_{x'}\ t_y = S_{y'}$$ [Equation 10]

$$\binom{a\ b}{c\ d} = \frac{1}{\Delta}\binom{S_{xx'}\ S_{yx'}}{S_{xy'}\ S_{yy'}}\binom{S_{yy}\ -S_{xy}}{-S_{xy}\ S_{xx}},$$ [Equation 11]

$$\Delta = S_{xx}S_{yy} - S_{xy}^2$$

The affine transformation is determined by 6 elements as shown in Equation 10. When the feature point in the current frame (N-th frame) is $P_i^n\ (x, y) = (x_i^n, y_i^n)$, and when the feature point obtained by performing the affine transformation with respect to the feature point in the previous frame ((N−1)-th frame is $\tilde{P}_i^{n-1}(x, y) = (\tilde{x}_i^{n-1}, \tilde{y}_i^{n-1})$, a distance between the feature point in the current frame and the feature point obtained by performing the affine transformation is represented by Equation 12.

$$D_i = |P_i^n(x, y) - T(P_i^{n-1}(x, y))|$$ [Equation 12]

$$= |P_i^n(x, y) - \tilde{P}_i^{n-1}(x, y)|$$

$$= \sqrt{(x_i^n - \tilde{x}_i^{n-1})(x_i^n - \tilde{x}_i^{n-1}) + (y_i^n - \tilde{y}_i^{n-1})(y_i^n - \tilde{y}_i^{n-1})}$$

The occlusion estimation unit 260 estimates that the object feature point of which the value $D_i$ is greater than a predetermined reference value is an occluded feature point and that $P_i^{n-1}$ is a coordinate of the current frame.

A pattern estimation unit 270 generates pattern information on the main parts of the object. Specifically, the pattern estimation unit 270 generates information on blinking of eyes and information on the shape of a mouth. Information on the mouth includes information on whether the mouth is opened or closed.

In order to obtain the information on the blinking of the eyes, the pattern estimation unit 270 calculates an x-axis directional edge and a y-axis directional edge by applying a Sobel operator to a predetermined region including a feature point of the eyes and calculates a correlation coefficient between a gradient map of the previous frame and a gradient map of the current frame. An edge can be calculated by differentiating the image in the x-axis and the y-axis directions by applying a Sobel mask as the most typical differential operator for detecting a profile. When the correlation coefficient between the aforementioned gradient maps is less than a predetermined reference value, the pattern estimation unit 270 determines that the eye blinks and calculates the information on the blinking of the eyes as the pattern information.

In order to obtain the information on the shape of the mouth, the pattern estimation unit 270 calculates edge points of the mouth and estimates an ellipse pattern constructed with the edge points. Specifically, it is possible to calculate a mean value of the gray levels of a predetermined region including two feature points of the mouth and one feature point of the upper lip, convert the image of the current frame into a binary image based on the calculated mean value, and estimate the mouth shape pattern depending on the current frame by searching the converted binary image for an edge point. The mouth shape pattern can be estimated by using an ellipse fitting process. An ellipse function can be represented by Equation 13.

$$f(x) = ax^2 + bxy + cy^2 + dx + ey = 1$$ [Equation 13]

$$(x^2, xy, y^2, x, y)(a, b, c, d, e)^T = 1$$ [Equation 14]

$$d(i) = (x_i^2, x_i y_i^2, x_i, y_i)$$ [Equation 15]

$$\hat{a} = [D^T D]^{-1} D^T l$$ [Equation 16]

When the edge points of the mouth are $p_1$ to $p_N$, and $p_i = [x_i, y_i]^T$, Equation 13 is an ellipse function with respect to edge points of the mouth, and Equation 14 is a vector form of Equation 13. When a dimension of a vector matrix D is N×5, a row d(i) of the vector matrix D is represented by Equation 15. The ellipse function of Equation 13 may be determined by a parameter $a=[a, b, c, d, e]^T$. In order to find the parameter a, it is possible to calculate â that approximately satisfies $p_1$ to $p_N$ by using Equation 16. 1 is an N×1 column vector whose elements are 1.

Hereinafter, a method of tracking an object according to an embodiment of the present invention will be described in detail with reference to the attached drawings and embodiments. The same description as that of the aforementioned apparatus for tracking an object will be omitted.

Figure 5:
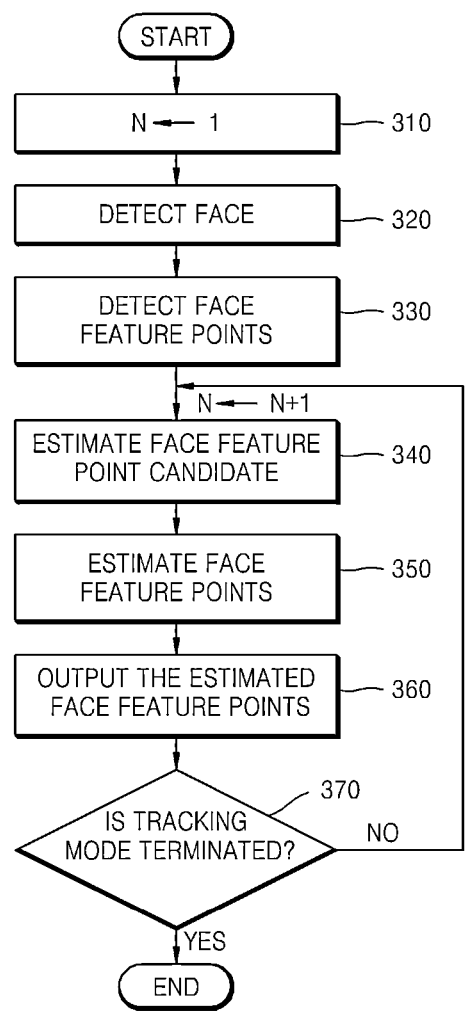
FIG. 5 is a flowchart illustrating a method of tracking an object according to an embodiment of the present invention.

FIG. 5 is a flowchart illustrating a method of tracking an object according to an embodiment of the present invention. The method of tracking an object according to the current embodiment includes the following operations which are processed according to a predetermined time sequence.

In operation 310, when the object starts to be tracked, the initialization unit 110 receives a video image of the first frame.

In operation 320, the initialization unit 110 detects a face image from the video image of the first frame. Although it is not shown in FIG. 5, if the face image is not detected from the first frame, the initialization unit 110 receives a video face image of the next frame and performs an operation of detecting a face and this process is repeated until a face image is detected. Specifically, it is preferable to detect a front face rather than to detect a side face or oblique face so as to accurately track the face and accurately estimate poses. As an example of a method of detecting a face, a method of detecting a front face is suggested by Paul Viola and Michael Jones in "Robust Real-Time Face Detection (2004)".

In operation 330, the initialization unit 110 detects eight face feature points (refer to the image A illustrated in FIG. 3) which represent main features of the face in the face image detected in operation 320. The existing methods of detecting the face feature points are the AAM, the ASM, and the like.

In operation 340, the first tracking unit 120 determines object feature point candidates of the current frame (the N-th frame) by using a difference between a pixel value of the (N−1)-th frame and a pixel value of the N-th fame. Specifically, in the current embodiment, the first tracking unit 120 calculates an optical flow in which a value ε(v) is minimized by using the LKT algorithm represented by Equations 1 to 5 and searches for a moving location of the object feature points according to the calculated optical flow.

In operation 350, the second tracking unit 130 searches a predetermined region surrounding the face feature point candidates of the N-th frame for a template similar to the template including the face feature points of the (N−1)-th frame. The found locations are locations of the face feature points which are moved in the N-th frame. It is advantageous in a processing time and a real time tracking method that a predetermined region surrounding face feature point candidates as compared with a case where a similar template is searched for in all the given frames.

Figure 7:
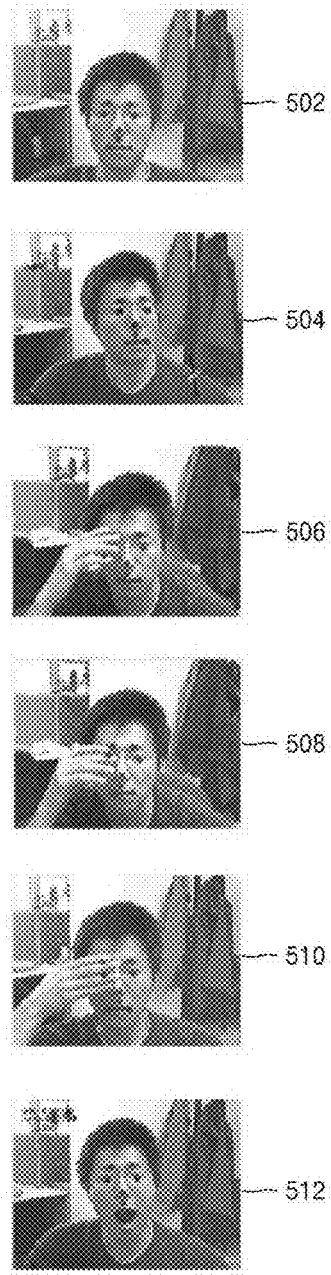
FIG. 7 is a reference view illustrating an experimental result of a method of calculating object pose information.

In operation 360, the second tracking unit 130 transmits the information on the object feature points determined in operation 350 to a display device so as to externally display the tracking result on the object feature points as shown in FIG. 7.

In operation 370, the apparatus for tracking the object determines whether a termination signal of the tracking mode is input. When the tracking mode is not terminated, operations 340 to 370 are repeated.

Figure 6:
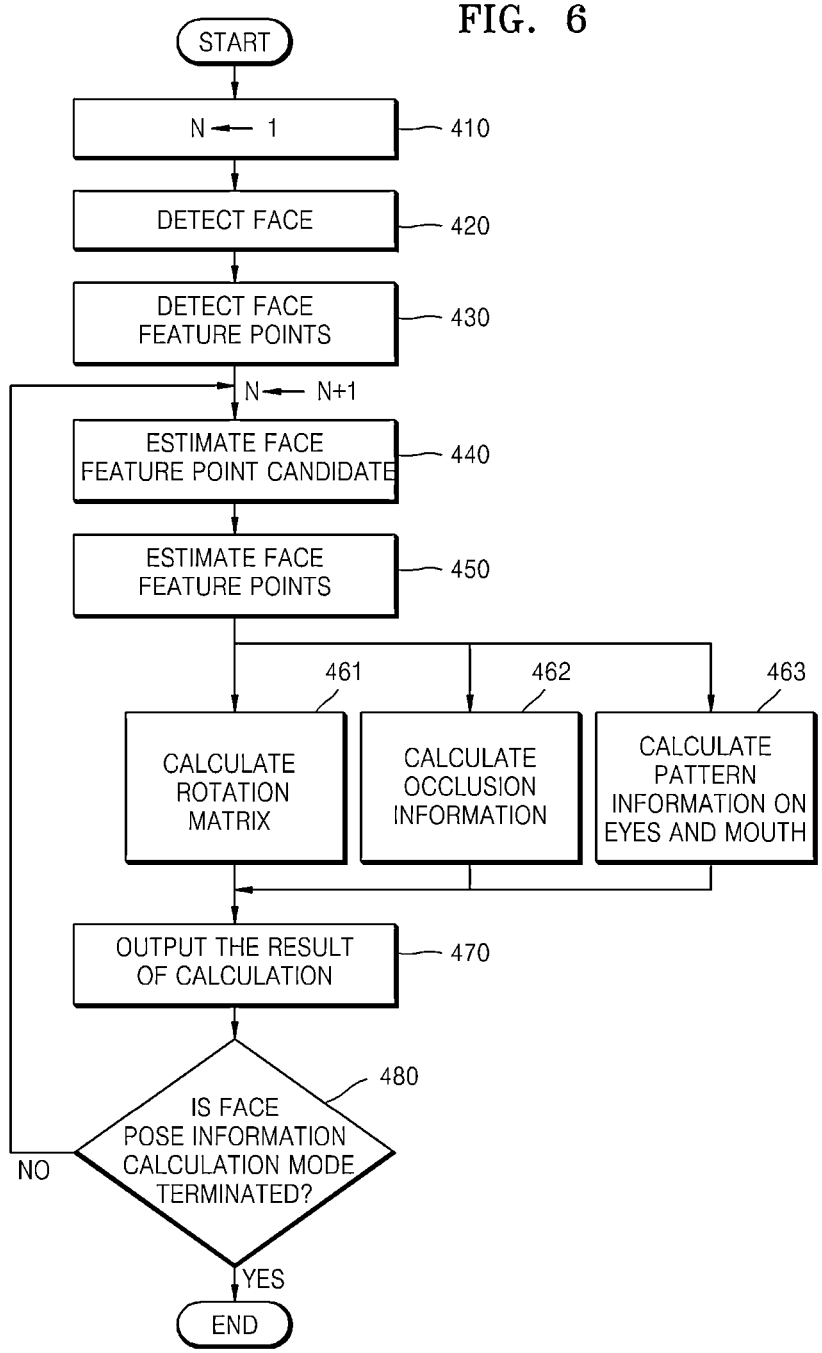
FIG. 6 is a flowchart illustrating a method of calculating object pose information according to an embodiment of the present invention.

Hereinafter, a method of calculating object pose information according to an embodiment of the present invention will be described in detail with reference to FIG. 6.

Since operations 410 to 450 are the same as the aforementioned operations 310 to 350, the same description will be omitted here.

In operation 461, the pose estimation unit 250 estimates a direction in which the face looks at by using location information of face feature points determined in operation 450. Specifically, the pose estimation unit 250 calculates a rotation matrix having a roll, a pitch, and a yaw as components. In operation 462, the occlusion estimation unit 260 estimates whether the face feature points are occluded and calculates occlusion information as a result of estimation on whether the face feature points are occluded. In operation 463, the pattern estimation unit 260 estimates a blinking pattern of the eyes and a pattern of the mouth shape which are the main parts of the face and calculates the pattern information as a result of estimation of the patterns.

In operation 470, the object information generation unit 240 outputs the rotation matrix, the occlusion information, and the pattern information, which are calculated in operations 461 to 463, respectively, to an external information processing device.

In operation 480, the object pose information calculation apparatus determines whether a termination signal with respect to an object pose information calculation process is input. If the termination signal is not input, operations 440 to 480 are performed again.

FIG. 7 illustrates an experimental result of a method of calculating object pose information. An image 502 is an initialized image. Eight face feature points of the image 502 are stored in the initialization unit. Images 504 to 512 are taken in various facial expressions and angles. Feature points estimated by tracking the object based on the image 502 are represented in the images 504 to 512. Experimental results according to an embodiment of the present invention are shown in the images 504, 508, 510, and 512. The pose information on the direction in which the face looks is represented in the image 504. The information on the mouth shape is represented in the image 512. In addition, the results obtained by tracking the occluded feature points among the face feature points are represented in the images 508 and 510. The image 506 is obtained by tracking the occluded feature points by using only the existing LKT method. In the image 506, it is shown that the location of the right eye is inaccurate.

It is possible to create a composite of a face image by using various angles and expressions by performing a face morphing process by using the object information calculated according to an embodiment of the present invention. In order to create a composite of an image, face image information in various angles is needed in addition to image information on the front face. When information on a face image of a predetermined person is insufficient, it is possible to use previously established image information on a face of a generic model. In addition, it is possible to create composites of various avatar images by using the pattern information on the eyes and the mouth calculated in operation 463. In addition, it is possible to create a composite of a face image by adding accessories to the face image in various angles and expressions. In addition, it is possible to create a composite of a face image at a new angle and having a new expression by using the given face images.

According to an embodiment of the present invention, the object feature point candidates are obtained by using pixel values of neighboring frames. It is possible to reduce a processing time needed for template matching by performing a template matching process in a predetermined region having the object feature point candidates as a center. The tracking of the object is robust in terms of sudden changes in lighting and partial occlusion. In addition, it is possible to track an object in real time with improved accuracy. In addition, according to an embodiment of the present invention, since the pose of the object, the pattern of the object, and the occlusion of the object are determined, detailed information on action patterns of the object can be obtained in real time.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

What is claimed is:

1. A method of tracking an object comprising:
   detecting predetermined object feature points in a previous frame;
   estimating object feature points of a present frame by using a difference between a pixel value of the previous frame and a pixel value of the present frame;
   estimating whether the estimated object feature points of the present frame are occluded based on a similarity between the estimated object feature points of the present frame and the detected object feature points of the previous frame, wherein the similarity is a distance between the estimated object feature points in the present frame and object features obtained by performing an affine transformation on the detected object feature points of the previous frame; and
   tracking the object based on the detected object feature points of the previous frame corresponding to the occluded object feature points of the present frame when the estimated object feature points of the present frame are occluded.

2. The method of claim 1, wherein the object feature points of the present frame are estimated by calculating an optical flow depending on the detected object feature points on the basis of the difference between the pixel value of the previous frame and the pixel value of the present frame and using the calculated optical flow.

3. The method of claim 2, wherein the optical flow is calculated by calculating the difference between the pixel value of the previous frame and the pixel value of the present frame based on an LKT (Lucas-Kanade-Tomasi) algorithm, and the object feature points of the present frame are estimated by using the calculated optical flow.

4. The method of claim 1, wherein the object feature points of the previous frame are detected by using AAMs (Active Appearance Models) or ASMs (Active Shape Models).

5. A non-transitory computer-readable recording medium having embodied thereon a computer program for executing the method of claim 1.

6. A method of calculating object pose information comprising:
   detecting predetermined object feature points in a previous frame;
   estimating object feature points of a present frame by using a difference between a pixel value of the previous frame and a pixel value of the present frame;
   calculating object pose information by using coordinate values detected in the previous frame and coordinate values of the object feature points estimated in the present frame;
   calculating an affine transformation between the coordinate values of the object feature points detected in the previous frame and the coordinate values of the object feature points estimated in the present frame;
   calculating the object feature points of the present frame by using the coordinate values of the object feature points detected in the previous frame and the calculated affine transformation; and
   calculating a similarity between the estimated object feature points of the present frame and the calculated object feature points and estimating whether the estimated object feature points of the present frame are occluded on the basis of the calculated similarity, wherein the similarity is a distance between the estimated object feature points in the present frame and the calculated object feature points of the present frame obtained by using the calculated affine transformation,
   wherein the object pose information further includes occlusion information on whether the object feature points in the present frame are occluded.

7. The method of claim 6, wherein the object feature points are estimated by estimating 2D (X-Y) locations of the object feature points, and the object pose information is calculated by further considering a 3D model of a general object and a table in which information (Z) on heights of the general object is stored.

8. The method of claim 6, wherein the object pose information includes rotation matrix information on directions of the object.

9. The method of claim 6, wherein the object feature points includes feature points related to eyes and a mouth selected from a human face, and the object pose information further includes information on blinking of the eyes or information on a shape of the mouth as pattern information.

10. The method of claim 6, wherein the object feature points include feature points related to an eye selected from a human face,
    wherein the method of calculating object pose information further comprises calculating an edge of an eye region by applying a Sobel operator to the present frame and the previous frame, generating a gradient map depending on the calculated edge of the eye region, and
    estimating whether the eye blinks according to a similarity or correlation between the gradient map of the present frame and the gradient map of the previous frame, and wherein the object pose information further includes pattern information on the blinking of the eye.

11. The method of claim 6,
wherein the object feature points include feature points related to a mouth selected from a human face,
wherein the method of calculating object pose information further comprises converting a predetermined image including the feature points related to the mouth into a binary level image and estimating an ellipse function that represents an edge of the mouth by using an ellipse fitting process, and
wherein the object pose information further includes pattern information on a shape of the mouth according to the estimated ellipse function.

12. A non-transitory computer-readable recording medium having embodied thereon a computer program for executing the method of claim 6.

13. An apparatus for tracking a video image object, including at least one processor, configured to
initialize, using the at least one processing device, a tracking process by detecting object feature points from a video image,
estimate object feature points of a present frame by using a difference between a pixel value of a previous frame and a pixel value of the present frame,
estimate whether the estimated object feature points of the present frame are occluded on the basis of a similarity between the estimated object feature points of the present frame and the detected object feature points of the video image from a previous frame, and
track the object based on the detected object feature points of the previous frame corresponding to occluded object feature points of the present frame when the estimated object feature points of the present frame are occluded,
wherein the similarity is a distance between the estimated object feature points in the present frame and object features obtained by performing an affine transformation on the detected object feature points of the previous frame.

14. An apparatus for calculating object pose information, including at least one processor, configured to initialize a tracking process by detecting object feature points from a video image,
detect predetermined object feature points in a previous frame,
estimate object feature points of a present frame by using a difference between a pixel value of a previous frame and a pixel value of the present frame,
calculate object pose information by using coordinate values of the object feature points detected by initializing the tracking process and coordinate values of the object feature points of the present frame,
generate rotation matrix information on directions of an object, generate occlusion information on whether the object feature points of the present frame are occluded, and generate pattern information on blinking of eyes and a shape of a mouth, wherein the at least one processor estimates whether the estimated object feature points of the present frame are occluded on the basis of a similarity between the estimated object feature points of the present frame and the detected object feature points of the previous frame,
wherein the similarity is a distance between the object feature points in the present frame and object features obtained by performing an affine transformation on the detected object feature points of the previous frame.

* * * * *